United States Patent

[11] 3,620,972

| [72] | Inventor | Ellis Glenn Fite<br>Bronxville, N.Y. |
|---|---|---|
| [21] | Appl. No. | 712,379 |
| [22] | Filed | Mar. 12, 1968 |
| [45] | Patented | Nov. 16, 1971 |
| [73] | Assignee | Stauffer Chemical Company<br>New York, N.Y. |

[54] METHOD OF AGGLOMERATING FINELY DIVIDED INORGANIC PHOSPHATES USING AN ORTHOPHOSPHATE AGGLOMERATING AID
17 Claims, No Drawings

[52] U.S. Cl. .................................................. 252/1, 99/117, 23/313
[51] Int. Cl. ...................................................... B01j 2/28, C05b 19/00
[50] Field of Search .......................................... 252/1; 23/105, 106, 108, 223, 313; 99/115, 117

[56] References Cited
UNITED STATES PATENTS

| 2,268,816 | 1/1942 | Gabeler .......................... | 23/313 X |
|---|---|---|---|
| 3,097,949 | 7/1963 | Lauck .......................... | 99/115 |
| 3,337,347 | 8/1967 | Kichline .......................... | 99/117 |
| 3,244,535 | 4/1966 | Lauck .......................... | 23/105 X |

Primary Examiner—John T. Goolkasian
Assistant Examiner—M. E. McCamish
Attorneys—Wayne C. Jaeschke, Daniel S. Ortiz and Martin Goldwasser ABSTRACT: A method is provided for agglomerating finely divided substantially insoluble inorganic phosphate compositions in the presence of an alkali metal orthophosphate having a $M_2O:P_2O_5$ ratio of from about 2:1 to about 3.21:1. M is an alkali metal having a molecular weight of from 20 to 41 inclusive. The material to be agglomerated is agitated and from about 5 to about 25 parts by weight water is added per 100 parts of material to be agglomerated. Agitation is continued until agglomeration is substantially complete and thereafter the agglomerated material is recovered. Additional embodiments include adding the water as steam, or as orthophosphate solutions.

METHOD OF AGGLOMERATING FINELY DIVIDED INORGANIC PHOSPHATES USING AN ORTHOPHOSPHATE AGGLOMERATING AID

This invention relates to a method of agglomerating finely divided, substantially insoluble phosphates. More particularly, this invention relates to a method for agglomerating finely divided, substantially insoluble, inorganic phosphate compositions in order to improve their physical handling properties, such as flow and the elimination of dusting.

The substantially inorganic phosphates are well known and have found particular utility in food compositions, especially cheese compositions wherein they serve as emulsifiers and also in baked goods as leavening agents. These compositions also are employed in dentifrice compositions and other non-food uses.

While these insoluble, inorganic phosphate materials have been widely used in the applications indicated above, they must be employed in a very finely divided state due to their substantial insolubility. If relatively large particles of the insoluble, inorganic phosphates are used in food compositions, they produce a gritty property to the food, which is greatly undesirable. The employment of finely divided, inorganic phosphates, however, has several inherent deficiencies, the most serious of which is dusting. The dust of these compositions is light and fills the air quite quickly in food-processing plants, creating cleaning and sanitation problems and unsatisfactory working conditions for the employees. An additional problem is handling these materials is that the finely divided particles do not flow easily.

While several proposals have been made in the past for the agglomeration of materials, or pelletizing, they have involved the employment of various binders such as sugars which cannot be tolerated in certain food applications, or they have involved the use of crystallizing syrups which are difficult to handle and which require a separate preparation step. While the processes of the prior art are effective and do provide a means of agglomerating finely divided organic material, until the present time no completely effective method had been proposed for reducing the dustiness of the inorganic, insoluble phosphates.

In accordance with the present invention, a method is provided for agglomerating finely divided, substantially insoluble, inorganic phosphate compositions in the presence of an alkali metal orthophosphate having a $M_2O:P_2O_5$ ratio of from about 2:1 to about 3.21:1, wherein the alkali metal has a molecular weight of from 20 to 41 inclusive such as sodium and potassium. This provision is accomplished by agitating the material to be agglomerated, adding from about 5 parts by weight to about 25 parts by weight water per 100 parts of material to be agglomerated, continuing agitation until agglomeration is substantially complete, and thereafter recovering the agglomerated material.

By the term "substantially insoluble, inorganic phosphate compositions" is intended those phosphate compositions having a substantial proportion of insoluble phosphate. Illustrative of the substantially insoluble, inorganic phosphates to which this invention is particularly applicable are the alkali metal aluminum phosphate compositions such as potassium and sodium aluminum phosphate compositions such as those having a sodium to aluminum to phosphorus ratio of from about 15 to 3 to 8; 15 to 2 to 8; 7 to 3 to 8; 7 to 2 to 8; 7 to 2.5 to 8; and the like. Also included within the term "substantially insoluble, inorganic phosphates" are the following insoluble phosphates:

| | |
|---|---|
| dicalcium phosphate | $CaHPO_4 \cdot H_2O$ |
| tricalcium phosphate | $Ca_3(PO_4)_2$ |
| calcium pyrophosphate | $Ca_2P_2O_7$ |
| calcium metaphosphate | $Ca(PO_3)_2$ |
| potassium metaphosphate | $KPO_3$ |
| insoluble sodium meta phosphate | $NaPO_3$ |

By the term "finely divided" is meant inorganic phosphate materials having a particle size sufficiently small to pass through a 100-mesh screen and preferably a 325-mesh screen or smaller.

By the term "alkali metal orthophosphate having a $M_2O:P_2O$ ratio of from about 2:1 to about 3.21:1" is intended disodium phosphate, dipotassium phosphate, trisodium phosphate, and tripotassium phosphate. M as used above is an alkali metal ion having a molecular weight of from 20 to 41 and includes sodium and potassium although sodium is preferred throughout because of its low cost and ready availability. For this reason, and for convenience, sodium will be used hereinafter as representative of such alkali metal ions. The disodium phosphate and trisodium phosphate employed are preferably anhydrous, although they can be used containing the various water of crystallization provided this water of crystallization is considered in determining the amount of water to be added in the process, as will be more thoroughly discussed hereinafter. While both the disodium phosphate and the trisodium phosphate will effect agglomeration, it is greatly preferred to utilize the disodium phosphate as this material is a normal constituent in alkaline sodium aluminum phosphate compositions, and is commonly employed with insoluble metaphosphates as this material provides functional properties in the food compositions. It has also been found to provide superior agglomeration affects in the conduct of the present invention.

The sodium orthophosphate should be present in the composition to be agglomerated in an amount of at least about 5 parts by weight on an anhydrous basis. While it can be employed from about 5 to about 75 parts by weight, it is preferred to utilize from about 25 to about 65 parts by weight. It should be noted that insoluble metaphosphate compositions and sodium aluminum phosphate compositions normally contain up to about 60 percent by weight of disodium phosphate. These compounds are normally present in sodium aluminum phosphate compositions as a result of their manufacture. These compounds are generally added to insoluble metaphosphate compositions as mixtures.

If the composition to be agglomerated contains sodium orthophosphate, it can be treated by the process of this invention directly. If, however, the composition to be agglomerated does not normally contain sodium orthophosphate as specified, then it is necessary to provide at least 5 parts by weight of this material. This addition can be affected preferably dry by dry-blending or it can be added as an aqueous solution containing from about 40 to about 80 percent sodium orthophosphate in water.

In conducting the agglomeration process of this invention the material to be agglomerated is charged to a suitable blending apparatus. Exemplary of such blenders are:

Patterson-Kelley Vee Blender
Rotary Balling Drum
Upright Batch Mixer (Hobart)
Agglomerator (O'Brien-Sumner)

The composition to be agglomerated can be agglomerated at elevated temperatures as it has been prepared or at room temperature or lower. This material is generally sufficiently ground to pass a 325-mesh screen. The material is charged to the blending apparatus and agitation is commenced. This agitation is continued throughout the entire process. If the material to be agglomerated naturally contains either disodium or trisodium phosphate, this material can be simply added to the blender and the process conducted. However, if the di- or trisodium phosphate must be added, it can be added at this stage as an anhydrous, finely divided powder.

While the inorganic phosphate material to be agglomerated is being agitated, water is added in an amount of from about 5 to about 25 percent by weight based upon the weight of the final agglomerated product. If too little water is added, agglomeration will be completed without agglomerating the entire mass of material to be agglomerated, and accordingly a large amount of fines will remain. If too much water is used, large lumps or even a solid mass results. It is accordingly preferred to employ from about 10 to about 20 percent by weight water.

The water can be added to the agitated mixture as a liquid, it can be sprayed into the mixture as fine droplets, or it can be introduced as steam in each instance until the required amount of water has been added.

The agitation of the mixture is continued until the finely divided particles have become agglomerated and no further agglomeration is being effected, i.e., the process is substantially complete. At this time the agitation is discontinued and the agglomerated mass is recovered.

It is desirable to screen the agglomerated material for size. In this respect, it has been found most preferable to remove as product that material which will pass a 10-mesh screen but remain on a 140-mesh screen as this material has been found to be optimum in respect to low dusting, although larger or smaller agglomerates can be removed, if desired. The oversized materials which do not pass a 10-mesh screen are crushed and rescreened. Those materials designated "fines" passing a 140-mesh screen are recycled to the agglomeration process.

In the embodiment described above, the sodium orthophosphate material is employed in an anhydrous condition. It is another embodiment of this invention that a sodium orthophosphate hydrate can be employed. When this material is utilized, it is possible to adjust the added water to a level such that the water of crystallization in the sodium orthophosphate and the added water constitute from about 5 to about 25 percent of the final agglomerated product. When employing sodium orthophosphates containing large amounts of water of crystallization such as disodium heptahydrate, disodium dodecahydrate, trisodium decahydrate, and trisodium dodecahydrate, it is possible to incorporate this material to the mass to be agglomerated as a melt, thereby avoiding the addition of water as a separate step. These materials contain a sufficient amount of water to substantially effect the agglomeration. In such case, however, the sodium orthophosphate must be added in an amount sufficient to provide water to the composition in an amount of from about 5 to about 25 percent by weight based upon the final agglomerated product.

When the sodium orthophosphate hydrate is employed as a melt, it is necessary to heat the sodium orthophosphate hydrate to a temperature in excess of its melting point.

The water content of hot, aqueous solutions of orthophosphates to be used for addition to insoluble phosphates is the same as that of the hydrate of that phosphate. The calculated water content of each of the orthophosphate hydrates is as follows:

| Type | M.P.,° C. | Mol. wt. | Percent $H_2O$ | Percent Phos. |
|---|---|---|---|---|
| $Na_3PO_4.12H_2O$ | 73–77 | 380.16 | 56.8 | 43.2 |
| $Na_3PO_4.10H_2O$ | 100.0 | 344.13 | 52.3 | 47.7 |
| $Na_2HPO_4.12H_2O$ | 35.1 | 358.22 | 60.3 | 39.7 |
| $Na_2HPO_4.7H_2O$ | 48.1 | 268.09 | 47.0 | 53.0 |
| $Na_2HPO_4.2H_2O$ | 95 | 178.01 | 20.2 | 79.8 |

In the table above, the approximate melting points of suitable sodium orthophosphate hydrates have been specified. It is necessary, however, to heat these materials to a temperature in excess of these melting points. It is preferred to heat them to temperatures of from about 5° to about 10° C. in excess of their melting points. When this is effected, the materials can then be added to the insoluble inorganic phosphate compositions to be agglomerated. The agitation is continued in the same manner until the materials have been effectively agglomerated and then recovered and treated as indicated above.

It is an additional embodiment of this invention that the sodium orthophosphate material can be added to the material to be agglomerated as a solution. In this case, however, it is desirable to employ an aqueous solution having a percent sodium orthophosphate of from about 40 to about 80. Such solutions can be made from any of the sodium orthophosphate hydrates or anhydrous materials.

As was indicated above, water is generally employed in an amount less than 25 percent by weight. It is possible, however, to employ greater amounts of water, if desired. In the event such excess water is employed, however, it is desirable to heat the mixture to be agglomerated and most preferable to agitate it under vacuum to remove the excess water not needed in the agglomeration procedure. Temperatures employed for the removal of excess water are generally in the range of from about 50° to about 130° C. Reduced pressures can be used in this instance, i.e. less than atmospheric, and it is preferred to use pressures of from about 4 to about 12 p.s.i.

It is yet an additional and preferred embodiment of this invention to employ from about 10 to about 50 percent sodium hexametaphosphate having a $P_2O_5$ content of at least 66 percent as an additional agglomerating material by weight based on insoluble phosphate. The employment of this material with the sodium orthophosphate provides exceptional properties to the agglomerates in that it reduces product-pasting to equipment and lowers dust more than when absent.

It should be noted that potassium polymetaphosphate can similarly be employed in the conduct of this invention.

It has been found most desirable to employ sodium hexametaphosphate or potassium polymetaphosphate in an amount of from 10 to about 35 percent.

The agglomerated, insoluble, finely divided, inorganic phosphates are characterized by easy flow characteristics and exceptionally low-dusting properties, made up of particles having size sufficiently small to pass a 350-mesh screen.

The examples which follow serve to illustrate this invention. In these examples and throughout this specification, all parts and percentages are by weight unless otherwise specified.

EXAMPLE 1–13

Procedure

The dry finely divided material to be agglomerated was charged in each instance to the mixing container for a Hobart Model C-100 three-speed mixer. In each case the dry particulate material was agitated at low speed for a period of about 2 minutes to insure homogeneity. Water was added slowly through a funnel over a period of about 2 minutes until the material was well agglomerated. The blender was then run at medium speed for a period of from about 15 to about 60 seconds.

The agglomerated material was then placed in a large jar, which was capped and shaken vigorously to observe dusting. A portion of the material was screened to pass a 10-mesh screen and remain on a 140-mesh screen. This screened material was placed in a small jar which was capped and shaken vigorously. Dusting properties were observed and recorded.

All materials to be agglomerated were dry, and ground to pass a 200-mesh screen, and were used in 1,000-gram quantities.

For convenience, in the examples which follow, abbreviations have been used. These abbreviations designate the following materials:

| | |
|---|---|
| DSP | Anhydrous disodium phosphate |
| TSP | Anhydrous trisodium phosphate |
| IMP | Dry insoluble metaphosphate |
| SHMP (–cl) | Dry sodium hexameta phosphate having the approximate average chain length designated in ( ). |
| SALP | Dry sodium aluminum phosphate having the approximate composition Na:Al:PO$_4$ of 15–207–8 and containing approximately 40% of DSP. |
| KPM | Potassium polymetaphosphate having an average chain length in excess of 1000. |

Formulations Employed

Example (1)
Material to be agglomerated:
    a. SALP                  700 grams
    b. TSP                    100 grams c. SHMP (10–12)     200 grams
water added     120 milliliters Example (2)
Material to be agglomerated:
    a. TSP     400 grams
    b. IMP     600 grams
water added     160 milliliters Example (3)
Material to be agglomerated:
    a. DSP     600 grams
    b. IMP 400 grams
water added     120 milliliters Example (4)
Material to be agglomerated:
    a. SALP     700 grams
    b. SHMP (25 cl.)     300 grams
water added     140 milliliters Example (5)
Material to be agglomerated:
    a. SALP     900 grams
    b. SHMP (10–12)     100 grams
water added     140 milliliters Example (6)
Material to be agglomerated:
    a. SALP     800 grams
    b. SHMP (10–12)     200 grams
water added     135 milliliters Example (7)
Material to be agglomerated:
    a. SALP     600 grams
    b. SHMP (10–12)     400 grams
water added     115 milliliters Example (8)
Material to be agglomerated:
    a. SALP     700 grams
    b. KPM     300 grams
water added     135 milliliters Example (9)
Material to be agglomerated:
    a. SALP     700 grams
    b. SHMP (37 cl.)     300 grams
water added     125 milliliters Example 10
Material to be agglomerated:
    a. IMP     1000 grams
water added     138 milliliters Example 11
Material to be agglomerated:
    a. DCP     700 grams
    b. SHMP     300 grams
    (10–12 cl.)
water added     110 milliliters Example 12
Material to be agglomerated:
    a. IMP     700 grams
    b. SHMP     300 grams
    (10–12 cl.)
water added     110 milliliters Example 13
Material to be agglomerated:
    a. SALP     900 grams
    b. TSP     100 grams
water added     190 milliliters Results The results of this series of examples is set forth below. Four observations were made as follows:

1. Appearance of material in blender during agglomeration.
2. Appearance of material on removal from blending container.
3. Appearance of material after shaking in jar.
4. Appearance of screened material after shaking.

OBSERVATION

| Example No. | No. 1 | No. 2 | No. 3 | No. 4 |
|---|---|---|---|---|
| (1) | Dry in appearance, little or no sticking to blade or container wall. | Dry, granular and free flowing. No dust apparent. | Dry, granular, No dust, few fines, little or no coating of jar wall. | No dusting. No coating of jar wall. |
| (2) | Dry in appearance, some sticking to blade and container wall. | do | Dry granular, slight dusting, moderate coating of jar wall. | Do. |
| (3) | do | do | Dry granular, slight dusting, slight coating of jar wall. | Do. |
| (4) | do | do | Dry granular, no dusting, slight coating of jar wall. | Do. |
| (5) | Dry in appearance, no sticking to blade or container wall. | do | Dry granular, no dusting, heavy coating of jar wall. | Do. |
| (6) | do | do | Dry granular, no dusting, no coating of jar wall. | Do. |
| (7) | do | do | Dry granular, no dusting, moderate coating of jar wall. | Do. |
| (8) | Dry in appearance some sticking to container wall and blade. | Dry, granular, heavy dusting | Heavy dusting, heavy coating of jar wall. | Free flowing, no dust. |
| (9) | Dry, no sticking to blade or container wall. | Dry, granular, free flowing, no dust. | Some dusting, no coating on jar wall. | No dust, free flowing. |
| (10) | Wet, no agglomerate | Wet, clammy | No dust, sticking to sides | No screening possible. |
| (11) | Dry appearing, some sticking, larger lumps. | Dry, some large lumps | No dust | Dry, free flowing. |
| (12) | Dry appearing, no sticking | Dry | do | No dust, free flowing. |
| (13) | Dry, free flowing | Dry | Moderate dust | Do. |

EXAMPLE 14

One kilogram of SALP was charged to the mixing container of the Hobart mixer and agitation was commenced. Water was added slowly until 225 milliliters had been charged. After the water had been added, the charge material formed a doughlike mass and stirring was continued for a period of 2 to 3 minutes. The product contained 18 percent water, and no fines, but 30 percent failed to pass a 10-mesh screen. There was no dust.

EXAMPLE 15

600 grams of IMP and 400 grams of TSP are charged to a mixing container of a Hobart mixer and agitation is commenced. Wet steam of 100° C. is added to the charged phosphates while mixing continues until 160 milliliters of water have condensed from the steam into the mixture. Substantially the same results are obtained as set forth in Example 2 above.

EXAMPLE 16

400 grams of IMP are charged to the mixing container of a Hobart mixer. The DSP·12H$_2$O is heated to a temperature between 40° and 50° C. When a complete melt is obtained the mixer is started and the molten DSP is sprayed into the IMP charge. Vigorous mixing is continued until the molten DSP crystallizes. Substantially the same results are obtained as set forth under Example 3 above.

SALP is effectively agglomerated in the same manner as Example 15 and 16 by substituting SALP for IMP in each instance.

Additional examples of insoluble inorganic phosphates and their properties can be found in U.S. Pat. No. 3,097,949 issued July 16, 1963 and U.S. Pat. No. 3,244,535 issued Apr. 5, 1966 to Lauck et al.

In respect to the particle size of the insoluble inorganic phosphate, the present process is applicable to phosphates having a size of 140-mesh. For food applications, however, as indicated above, much finer particles must be employed. Such food grade particles should be smaller than 200-mesh and most preferably smaller than 325-mesh.

By the mesh size is intended U.S. Screen size as applied to particles. It is therefore intended herein that a 200-mesh particle will pass a 200-mesh screen. Micron sizes for such screens is given below for convenience:

| Mesh No. | Size in Microns |
|---|---|
| 10 | 2,000 |
| 20 | 840 |
| 30 | 590 |
| 100 | 149 |
| 140 | 105 |
| 170 | 88 |
| 200 | 74 |
| 230 | 62 |
| 270 | 53 |
| 325 | 44 |
| 400 | 37 |

What is claimed is:

1. The method of agglomerating finely divided, substantially insoluble, inorganic phosphate compositions which comprises:
   1. applying agitation while preparing a composition comprising:
      a. at least one finely divided, substantially insoluble, inorganic phosphate composition;
      b. an alkali metal orthophosphate having an $M_2O:P_2O_5$ ratio of from about 2:1 to 3.21:1 wherein the alkali metal ion, M, has a molecular weight of from about 20 to about 41; and
   c. from about 5 to about 25 parts by weight water per hundred parts by weight agglomerated composition;
   2. continuing agitation until the agglomeration is substantially complete; and
   3. recovering the agglomerated material.

2. The method of claim 1 wherein the insoluble inorganic phosphate is sodium aluminum phosphate.

3. Method of claim 1 wherein the insoluble inorganic phosphate is insoluble metaphosphate.

4. The method of claim 1 wherein the alkali metal orthophosphate is disodium phosphate.

5. The method of claim 1 wherein the alkali metal orthophosphate is trisodium phosphate.

6. The method of claim 1 wherein the water is introduced to the material to be agglomerated as steam.

7. The method of claim 1 wherein the alkali metal orthophosphate employed is a hydrate containing at least 7 molecules of water per molecule of orthophosphate and wherein it is introduced to the material to be agglomerated in a molten condition.

8. The method of claim 7 wherein the alkali metal orthophosphate hydrate is disodium phosphate duohydrate.

9. The method of claim 1 wherein sodium hexametaphosphate is additionally present in an amount of from about 10 to about 50 percent by weight based upon insoluble inorganic phosphate.

10. A free-flowing substantially homogeneous inorganic agglomerated product consisting essentially of an insoluble inorganic phosphate, from about 25 to about 75 percent by weight of an alkali metal orthophosphate based upon anhydrous weight from about 0 to about 50 percent by weight of an alkali metal hexametaphosphate having a $P_2O_5$ content in excess of 66 percent, based on the anhydrous weight and from about 5 to about 25 percent by weight water based on the weight of the final product, wherein said insoluble inorganic phosphate has a primary particle size sufficiently small to pass a screen having a mesh size of at least 200, that alkali metal has in both instances a molecular weight of from 20 to 41 and said agglomerated product is of a size between 10-mesh and 140-mesh.

11. The product of claim 10 wherein the insoluble inorganic phosphate is sodium aluminum phosphate.

12. The product of claim 10 wherein the insoluble inorganic phosphate is insoluble metaphosphate.

13. A product of claim 10 wherein the alkali metal orthophosphate is disodium phosphate.

14. The product of claim 10 wherein the orthophosphate is trisodium phosphate.

15. The product of claim 10 wherein the alkali metal hexametaphosphate is present in an amount of from about 10 to about 50 percent by weight.

16. The product of claim 10 wherein the insoluble inorganic phosphate is a sodium aluminum phosphate, the alkali metal orthophosphate is disodium phosphate and the alkali metal hexametaphosphate is sodium hexametaphosphate, and the insoluble inorganic phosphate has a primary particle size sufficiently small to pass a screen having a mesh size of at least about 325.

17. The product of claim 10 wherein the insoluble inorganic phosphate is insoluble metaphosphate, the alkali metal orthophosphate is disodium phosphate, the alkali metal hexametaphosphate is sodium hexametaphosphate and the inorganic phosphate has a primary particle size sufficiently small to pass a screen having a mesh size of at least 325.

* * * * *